US006754892B1

(12) United States Patent
Johnson

(10) Patent No.: US 6,754,892 B1
(45) Date of Patent: Jun. 22, 2004

(54) INSTRUCTION PACKING FOR AN ADVANCED MICROPROCESSOR

(75) Inventor: Stephen C. Johnson, Los Gatos, CA (US)

(73) Assignee: Transmeta Corporation, Santa Clara, CA (US)

( * ) Notice: Subject to any disclaimer, the term of this patent is extended or adjusted under 35 U.S.C. 154(b) by 0 days.

(21) Appl. No.: 09/464,638

(22) Filed: Dec. 15, 1999

(51) Int. Cl.[7] .................................................. G06F 9/45
(52) U.S. Cl. ...................... 717/141; 717/142; 717/143; 717/146; 717/149; 717/151; 712/12; 712/23; 712/24; 712/30; 712/300
(58) Field of Search ................................ 717/140, 141, 717/142, 143, 146, 149, 151; 712/1, 5, 24, 30, 42, 222, 224, 300, 221, 21, 23, 62, 244, 204; 711/3, 133, 137

(56) References Cited

U.S. PATENT DOCUMENTS

| 4,259,718 A | * | 3/1981 | Kaman et al. ............... 712/245 |
| 4,312,036 A | * | 1/1982 | Porter et al. ..................... 711/3 |
| 4,314,331 A | * | 2/1982 | Porter et al. ................. 711/133 |
| 4,371,927 A | * | 2/1983 | Wilhite et al. ............... 711/137 |
| 4,491,908 A | * | 1/1985 | Woods et al. ................ 712/210 |
| 5,057,837 A | * | 10/1991 | Colwell et al. ................ 341/55 |
| 5,129,066 A | * | 7/1992 | Schmookler ................. 712/224 |
| 5,179,680 A | * | 1/1993 | Colwell et al. .............. 711/125 |
| 5,301,341 A | * | 4/1994 | Vassiliadis et al. .......... 712/215 |
| 5,485,629 A | * | 1/1996 | Dulong .......................... 712/24 |
| 5,649,135 A | * | 7/1997 | Pechanek et al. ............ 712/200 |
| 5,857,103 A | * | 1/1999 | Grove ........................... 717/158 |
| 5,862,398 A | * | 1/1999 | Hampapuram et al. ........ 712/24 |
| 5,974,539 A | * | 10/1999 | Guttag et al. ................ 712/221 |
| 6,065,106 A | * | 5/2000 | Deao et al. ..................... 712/24 |
| 6,101,592 A | * | 8/2000 | Pechanek et al. .............. 712/20 |
| 6,202,142 B1 | * | 3/2001 | Narayan et al. .............. 712/204 |
| 6,282,633 B1 | * | 8/2001 | Killian et al. ................ 712/208 |
| 6,317,872 B1 | * | 11/2001 | Gee et al. ..................... 717/152 |
| 6,343,373 B1 | * | 1/2002 | Koizumi et al. ............. 717/146 |
| 6,397,379 B1 | * | 5/2002 | Yates et al. .................. 717/140 |
| 6,442,701 B1 | * | 8/2002 | Hurd ........................... 713/324 |
| 6,453,407 B1 | * | 9/2002 | Lavi et al. ..................... 712/24 |
| 6,571,386 B1 | * | 5/2003 | Figurin et al. ............... 717/154 |
| 6,618,804 B1 | * | 9/2003 | Steele et al. ................. 712/300 |

OTHER PUBLICATIONS

TITLE: Architecture and compiler tradeoffs for a long instruction wordprocessor, author: Cohn et al, ACM, 1989.*
TITLE: Combining as a compilation technique for VLIW architectures, Author: Nakatani et al, ACM, 1989.*
TITLE: A VLIW architecture for a trace scheduling compiler, author: Colwell et al, ACM, 1987.*
TITLE: RISC I: a reduced instruction set VLSI computer, author: Patterson, ACM, 1998.*
TITLE: Core–Based RNS ALU with customized instructions, author: Ray, IEEE, 1990.*

* cited by examiner

Primary Examiner—Chameli C. Das

(57) ABSTRACT

A process for packing an instruction word including providing a word value representing an instruction word into which an operation is to be fit be equal to some initial value having a plurality of portions representing constraints, operating on the initial value of the value word with operation class values having a plurality of portions representing constraints of a new operation as the new operation is attempted to be fit into the instruction to affect the processor word value in a manner to indicate when the limit of any constraint for the instruction is reached, and determining a violation of any constraint to determine that the new operation does not fit the format.

17 Claims, 2 Drawing Sheets

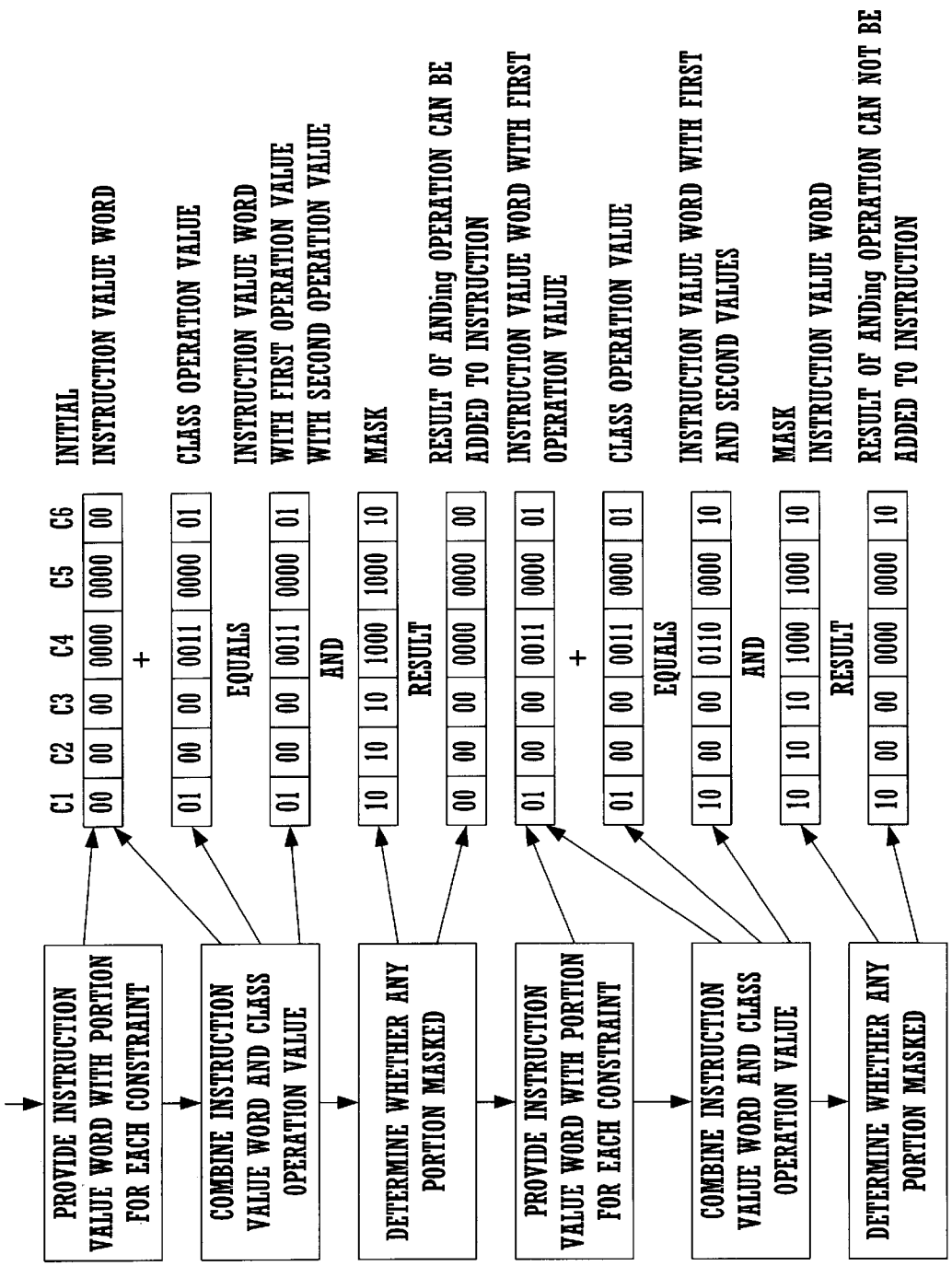

INSTRUCTION PACKING FOR AN ADVANCED MICROPROCESSOR

BACKGROUND OF THE INVENTION

1. Field of the Invention

This invention relates to computers and, more particularly, to a method for choosing operations to include in instructions for a very long instruction word (VLIW) microprocessor.

2. History of the Prior Art

A very long instruction word (VLIW) processor includes a number of different functional units which provide circuitry for processing a number of individual operations simultaneously. For example, one such processor includes two arithmetic and logic units (ALUs), a floating point unit (FPU), and a memory unit. These units perform their individual operations in parallel by responding to individual commands (sometimes herein called "atoms") a number of which are contained in a single instruction word (sometimes herein called a "molecule"). Typically, the atoms command such functions as fetch, load, add, move, and store, each of which causes one of the functional units to carry out the commanded operation.

In order to handle a number of operations at the same time in its different functional units, a VLIW processor must receive the atoms in an instruction word arranged in a format which the processor is capable of recognizing and utilizing. One embodiment of a particular VLIW processor is capable of recognizing atoms which appear in six different formats. In two of these formats, molecules each include four individual atoms; while in the remaining four formats, molecules each include two atoms. In any of these formats, all atoms occupy the same number of bits.

Most processors receive instructions for execution which have been generated from original source code by a compiler. One of the jobs of a compiler is to arrange the various instructions into proper formats and to place them in an order in which they may be rapidly executed by the particular processor. Normally, a compiler does this job statically as a part of the programming function long before a program is ready for execution. Once the compiler has finished, the code is simply run by a processor in the ultimate form furnished by the compiler.

However, one particular VLIW processor executes programs designed for other "target processors." This VLIW processor receives its instructions in a form adapted to be executed by a target processor which typically has an entirely different instruction set than does the VLIW processor. The VLIW processor dynamically translates the stream of target instructions into instructions of its own host instruction set and stores those translated host instructions so that they may be executed without retranslation. This VLIW processor is described in detail in U.S. Pat. No. 5,832,205, Kelly et al issued Nov. 3, 1998, and assigned to the assignee of the present invention.

The translated instructions are atoms representing operations that the functional units of the host VLIW processor can execute but which are arranged in no particular instruction word format recognizable by that processor. Because the atoms are in no recognizable format, the operations (atoms) must be rearranged into the formats (molecules) of the long instruction words which the processor is able to execute.

In order to accomplish the process of placing operations into formats (packing) for a typical VLIW processor of the prior art, a typical compiler designed in accordance with teaching of the prior art creates a data structure for each format which the processor can execute. Initially, each of these data structures is empty. As each new operation is presented, the compiler packing process tests the data structures in serial order to determine whether the operation fits the format of any of those instruction words. If an operation fits a format, the data structure is masked to indicate that a place has been reserved for the operation. Since some operations may be executed by a number of different functional units, the process does not stop after detecting a format into which an operation fits but continues testing and masks each data structure representing a format into which the operation may fit. If an operation may fit into more than one position of a particular format, then duplicate copies of the data structure for the format are created and masked at the different positions. The result is that during the packing process there may be many partially filled data structures representing formats at any time. Because some operations may be executed by a number of different functional units, those data structures masked for the same operation must also be linked by the packing process in some manner so that a format in which space has been reserved but which is not used may be appropriately handled when another format is ultimately selected.

With each succeeding operation, the same serial testing process is carried out to determine when the operation fits a format. Once a format is filled, it is selected to be used and passed on to other processes of the compiler.

As may be seen, this process requires a large number of data structures and a relatively large series of looping and linking operations in order to find formats into which each succeeding operation may be appropriately placed. Although the time consumed by a compiler which accomplishes its operations statically is not significant to the operation of the compiles program, the aforementioned VLIW processor must carry out a packing operation each time a target program is run throughout the operation of the program. Consequently, the time to accomplish this packing function can significantly slow the operation of such a processor. For example, to carry out a single significantly optimized packing operation utilizing a typical compiler process in the above-described processor requires about thirty-four system clock intervals.

It is desirable to provide a new faster process for packing instructions into proper formats for a computer processor.

SUMMARY OF THE INVENTION

The present invention is realized by a method for packing operations into formats including the steps of providing a word value representing an instruction word into which an operation is to be fit be equal to some initial value having a plurality of portions representing constraints, operating on the initial value of the value word with operation class values having a plurality of portions representing constraints of a new operation as the new operation is attempted to be fit into the instruction to affect the processor word value in a manner to indicate when the limit of any constraint for the instruction is reached, and determining a violation of any constraint to determine that the new operation does not fit the format.

These and other features of the invention will be better understood by reference to the detailed description which follows taken together with the drawings in which like elements are referred to by like designations throughout the several views.

BRIEF DESCRIPTION OF THE DRAWINGS

FIG. 2 is a flow chart illustrating one embodiment of a packing process designed in accordance with the present invention.

DETAILED DESCRIPTION

Figure 1:
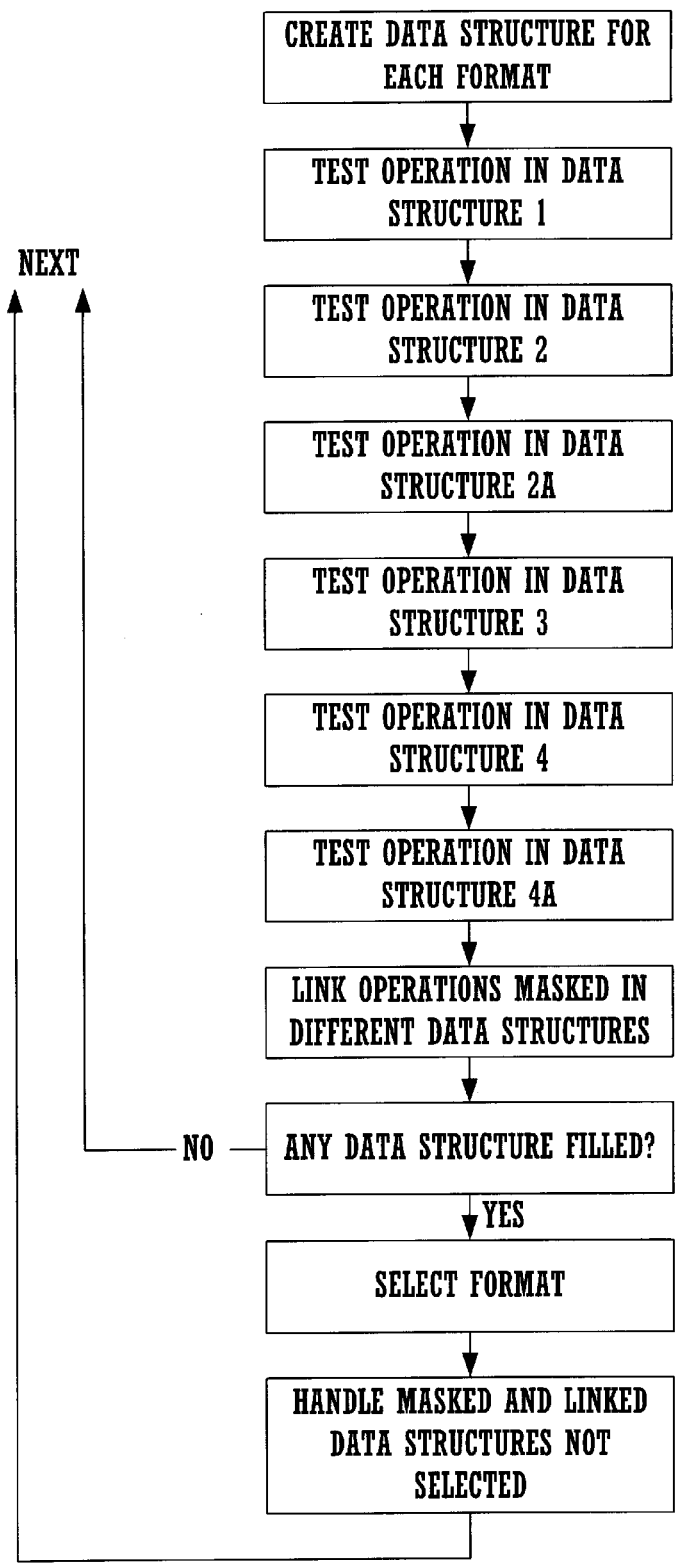
FIG. 1 is a flow chart illustrating a prior art packing process.

The present invention has wide application for packing operations in VLIW computer systems having few or many functional units. The invention may also be practiced by various programs used to compile source code written in various languages to run on any of a myriad of computers. However, in order to explain the invention clearly, it will be presumed that the invention is carried out by a computer utilizing a very simple VLIW processor.

The typical method of packing utilized by the prior art when used by the above-described VLIW processor is illustrated in FIG. 1. This method provides for each operation which is to be packed into an instruction a list of legal formats that can hold all operations. If an operation may be accomplished by more than one functional unit, multiple copies of the formats which provide multiple positions for an operation are provided. The packing process loops through the list to test all of the formats (and duplicate copies of formats) available for that operation. Once an appropriate format has been determined to hold an operation, the data structure for that format is masked to indicate the inclusion of the operation in the particular format and the search continues. During the search, the process must link the various formats into which an operation will fit. When the search for available formats is completed and all formats into which the operation will fit have been masked, the list of available formats is updated by another looping operation which handles appropriately those formats into which the operation fit but which were not selected.

When this packing process is performed by a compiler which functions statically, the time required by the process is not limiting. However, the process takes an inordinate amount of time when the operation is being carried out in real time by a VLIW computer which must pack operations being translated dynamically as an application is being executed.

Instead of the involved process utilized by the typical compiler of the prior art, the present invention provides a very rapid packing process which may be utilized by either static or dynamic compilers for a plurality of different processors. The process is based upon the definition of different classes of operations which may be performed by the processor. Each of these classes is based on the number of individual functional units of the processor which are able to execute the particular operation. For example, one class of operation may only be carried out by one of the many functional units; another class of operations may be carried out by two different functional units. These classes define a plurality of constraints on the number of operations of different classes under which any packing process must be carried out. These constraints may be stated mathematically.

For example, it will be assumed that an exemplary processor includes three functional units: F1, F2, and F3. It will be assumed that operations (atoms) may be classified as follows:

Type A: Operations which can be performed only in F1,

Type B: Operations which can be performed in either F1 or F2,

Type C: Operations which can be performed only in F2, and

Type D: Operations which can be performed only in F3.

It will also be assumed that there are two formats (molecules) in which instructions may be presented:

Format 1: (one F1 operation and one F2 operation), and

Format 2: (one F3 operation and one F2 operation).

With the constraints provided by these assumptions, a number of inequalities may be derived which define the exemplary system. First:

$$a<=1,$$

$$b<=2,$$

$$c<=1,$$

$$d<=1,$$

where a, b, c, and d are the maximum number of operations of types A, B, C, and D, respectively.

Similarly, the individual formats for the instructions which the processor is capable of recognizing constrain the packing process which can be carried out by limiting the number of the particular classes of operations which can be in any instruction word. These constraints can also be stated mathematically.

Using the same terms:

$$a+b+c<=2,$$

$$d+b+c<=2,$$

because there can be no more than two operations in any format; and $$a+d<=1,$$

because both an A type operation and a D type operation cannot exist in the same instruction.

Moreover, the inequality b<=2 may be eliminated since it is implied by the inequalities a+b+c<=2, and d+b+c<=2.

Then, the inequalities generated are tested by listing all of the integer solutions which can be found. It may be verified that no other solutions exist for the set of format and types which have been generated. Should additional solutions exist, then additional inequalities are generated until all inequalities have been determined.

Once all of the constraints for each of the classes of operations and all of the formats have been determined, a single binary word can be formulated which has portions representing each of the constraints controlling the packing process for all classes of operations and all formats of instructions. For example, the binary word for the exemplary processor should include portions for each of the controlling constraints:

$$a<=1,$$

$$c<=1,$$

$$d<=1,$$

$$a+b+c<=2,$$

$$d+b+c<=2,$$

$$a+d<=1,$$

The length of each portion of the value word will be determined by the number of possible occurrences for the particular constraint for the class of operation. For example, a binary value word for the exemplary processor may include sixteen bits with a first two bits representing the "a<=1" constraint which limits the type A class of operations to a single occurrence, a next two bits representing the next constraint with a similar limitation, a third two bits representing the next constraint with a similar limitation, a next four bits representing the "a+b+c<=2" constraint limiting these three classes of operations to two occurrences, a next four bits representing a fifth similar constraint, and a last two bits representing the "a+d<=1" constraint.

| Con. 1 | Con. 2 | Con. 3 | Con. 4 | Con. 5 | Con. 6 |
|--------|--------|--------|--------|--------|--------|

A value can then be assigned to the generalized word format for each class of operations to indicate the constraints affecting that particular class of operations. This operation is performed to provide a value word for each class of operations.

| Con. 1 | Con. 4 | Con. 6 |
|--------|--------|--------|

For example, Class A operations are affected by the three constraints illustrated above and would be generated from values placed in those portions of the generalized word format.

In general, values are selected for each of the portions of the value words for a class of operations so that when the constraint for that portion of the value word is violated it can be quickly determined. There are many ways in which this may be accomplished.

In one embodiment of the invention, the value word for each processor instruction is initially a zero binary number. The values used for each portion of the value words used for each class of constraint are such that when the constraint represented by that portion is exceeded, the portion can be tested to determine that the constraint has been exceeded. To determine when the constraint is exceeded, each new operation is tested to determine whether it fits an existing value word for the processor by adding the operation value to the existing value word.

In this embodiment, a two bit position portion may indicate the inequality a<=1, which indicates that in the system a type A operation can appear no more than once in an instruction. Similarly, two bit position portions may indicate each of the inequalities c<=1 and d<=1, which also indicates that in the system type C and type D operations can appear no more than once in an instruction.

In the described embodiment, a separate four bit position portion may indicate the inequality a+b+c<=2, which indicates that in the system the total of type A, type B, and type C operations can be no more than two in any format. Similarly, another separate four bit position portion may indicate the inequality d+b+c<=2, which indicates that in the system the total of type D, type B, and type C operations can be no more than two in any format. Finally, for the exemplary system, another separate two bit position portion may represent the inequality a+d<=1, which indicates that in the system the total of type A and type D operations can be no more than one in any format.

FIG. 2 illustrates the manner in which the packing process takes place. Presuming that the processor value word is zero and a class A operation is presented to the compiler packing operation, the class A value is added to the processor value word. Since the processor value word was initially zero, once the class A operation value is added, the processor value word is equal to the class A operation value; that is, the processor value word has values in those portions which are equal to the values in the identical potions of the class A operation value. Presuming that the class A operation value is "01" for the portion designated "Constraint 1" above, is "0011," for the portion designated "Constraint 4" above, and is "01" for the portion designated "Constraint 6" above, then the processor value word will be as shown after the operation has been added.

In order to determine whether the operation fits the instruction represented by the processor value word, it is only necessary to determine whether the instruction value word plus the operation value causes any portion which had already met the constraint before the operation value was added to generate the indication that the constraint is now exceeded. In the embodiment being described, the portions of the class operation values are selected so that whenever another class operation value is added to that portion so that the constraint represented by that portion is exceeded, the highest valued bit of the portion is set to a "one." With such class operation values, a mask for the entire instruction value word has a "one" in each highest bit position and zeroes in all other bit positions (as illustrated in FIG. 2) will when ANDed with the processor value word generate a "one" for any portion of the processor value word the constraint for which has been violated.

This will not occur when a first operation is added to an empty instruction. However, if a second class A type operation is attempted to be added to the instruction already holding a first class A operation value, the addition of a "01," to the value of the portion representing "Constraint 1" causes the value of that portion of the processor value word to become "10." When the processor value word holding sum of the two class A operation values is ANDed with a mask of "10" for that portion of the value word representing "Constraint 1," a "one will be generated for that portion of the processor value word indicating that the second class A operation will not fit the instruction.

It will be noted that none of the other portions of the processor value word representing other constraints produce a "one" when ANDed with the mask. First, only portions representing "Constraints 1, 4, and 6" are increased when class A operation values are added. Consequently, the portions of the processor value word representing "Constraints 2, 3, and 5" are still zero. Then, the portion representing "Constraint 4" holds "0110" since two values of "0011" have been added to it. A mask value of "1000" for that portion does not generate a "one" at the highest order bit position. Finally, the portion representing "Constraint 6" holds "01" since a single value of "01" has been added to it. A mask value of "10" for that portion does not generate a "one" at the highest order bit position.

Thus, it will be seen that maintaining a processor value word, adding a class operation value to the word whenever a new operation is to be tested, and ANDing a mask with the result indicates whether the operation fits into the instruction. This is significantly simpler than the process of the prior art. In fact, the particular packing operation requires only a few clock cycles (e.g., four or five) in an actual system to accomplish what had previously taken approximately ten times as long.

It will be seen that the packing operation of this embodiment will produce similar results with other operations. For example, if an attempt is made to pack a class D operation in an instruction word which already includes a class A operation, the class D operation value includes values in each of the portions representing "Constraints 3, 5, and 6." Thus, when the class D value is added to the processor value word already holding a class A operation, the value of the portion representing "Constraint 6" will be "10." When this is ANDed with the mask value, a non-zero value is generated for that portion indicating that the class D operation will not fit the instruction.

Similarly, if a class A operation and a class B operation are each added to an instruction word which was initially empty, the class A value will add to portions representing "Constraints 1, 4, and 6" while the class B value will add to portions representing "Constraints 4 and 5." Although the portions representing "Constraints 2, 3, and 5" do not yet contain values which will exclude further operations, the portion representing "Constraints 1, 4, and 6" holds, respectively, values of "01, 0110, and 01" indicating that each portion has met the constraint that the portion represents. Any attempt to add another class A, class B, class C, or class D operation will generate a one from one of these portions when ANDed with the mask indicating that the operation will not fit the instruction.

There are many embodiments of the invention. First, although the value word was presumed to be sixteen bits in length, other values are obviously possible and would function. It is most reasonable to use a value word which is as short as possible under the circumstances in order to limit the number of operations necessary to accomplish adding operation values and testing. Value words of thirty-two and sixty-four bits would obviously be reasonable. It is preferable but not necessary to restrict the processor value word to a typical register size.

Nor is it necessary to utilize a processor value word which is initially zero. There are other initial values which would function as well although they might require more operation steps. Nor is it necessary that the class operation value be added to the processor value word; it might as well be subtracted from the processor value word. What is necessary is that the value of a portion of the processor word representing a particular constraint be such as to indicate when that portion of the value word has exceeded the limit of the associated constraint.

It is also not necessary that a mask be ANDed with the processor value to determine whether a constraint has been met. Any manner of determining that the value of the portion has exceeded the limit permitted by the constraint represented is sufficient.

What is necessary is that a word value representing an instruction word into which an operation is to be fit be equal to some initial value and that operation class values act upon that processor word value as each new operation is attempted to be fit into the instruction. These class operation values must affect the processor word value in a manner to indicate when the limit of any constraint for the instruction is reached. Finally, a means of determining a violation of any constraint must be included to provide an indication that the new operation does not fit the format. Although not a portion of the present invention, this has the effect of causing another instruction word to be selected for the new operation.

Another embodiment of the invention, for example, may be based on the following values, where N is the number of occurrences in a particular constraint, "# bits" is the number of bits representing a particular constraint, "value" is the operation value for the portion, "mask" is the mask value for the portion, and "initial value" is the initial value for the portion of the processor word.

| N | # bits | value | mask | initial value |
|---|--------|-------|------|---------------|
| 1 | 2 | 01b | 10b | 00b |
| 2 | 3 | 001b | 100b | 001b |
| 3 | 3 | 001b | 100b | 000b |
| 4 | 4 | 0001b | 1000b | 0011b |
| 5 | 4 | 0001b | 1000b | 0010b |

Thus, for the exemplary processor, the initial binary value word is "00000000100100." The mask binary value is "10101010010010." A class A operation has a binary value of "01000000100001," a class B operation has a binary value of "00000000100100," a class C operation has a binary value of "00010000100100," and a class D operation has a binary value of "00000100000101." The packing operation begins by initializing the processor word value, continues by adding the first class operation value to the processor word value, tests for violation of the constraints by ANDing with the mask value, continues by adding the second class value to the processor word value, and tests for violation of the constraints by again ANDing with the mask value. Any violation generates a one and indicates that the operation does not fit the instruction.

Another embodiment of the invention may be practiced utilizing the following values in constructing the processor initial values word, the class operation values, and a mask.

| N | # bits | value | mask | initial value |
|---|--------|-------|------|---------------|
| 1 | 1 | 1b | 1b | 0b |
| 2 | 2 | 01b | 01b | 01b |
| 3 | 2 | 01b | 01b | 00 |
| 4 | 3 | 001b | 001b | 011b |
| 5 | 3 | 001b | 001b | 010b |

With this embodiment, a mask is constructed with a "one" at the left followed by the individual mask elements. Moreover, the test for this embodiment is slightly more complicated requiring that the value word added to the value of the operation be exclusively ORed with first the value word and then the value of the operation before ANDing with the mask. Other embodiments will be apparent to those skilled in the art. Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A process for packing an instruction word comprising the steps of:

providing an instruction word value representing an instruction word into which an operation is to be fit, wherein the instruction word value is a binary word, the binary word having a plurality of portions representing constraints on packing the operation word into the instruction word, operating on the instruction word value with an operation class value having a plurality of portions representing constraints of the operation as the operation is attempted to be fit into the instruction word to affect the instruction word value in a manner to indicate when the limit of any constraint for the instruction word is reached, and determining a violation of any constraint to determine that the operation does not fit the format.

2. A process as claimed in claim 1 comprising the additional step of repeating each step for each additional operation to be fit into an instruction word.

3. A process as claimed in claim 1 in which an initial instruction word value representing an instruction word is a binary word for zero, the step of operating on the instruction word value with an operation class value comprises adding an operation value to the initial instruction word value to provide a result, and the step of determining a violation of any constraint comprises ANDing a mask value with the result to provide an indication.

4. A process as claimed in claim 1 in which, the operational value, the mask value, and the indication are also binary words.

5. A process as claimed in claim 4 in which an initial instruction word value representing an instruction word is a zero, the step of operating on the instruction word value with an operation class value comprises adding an operation value to the initial instruction word value to provide a result, and the step of determining a violation of any constraint comprises ANDing a mask value with the result to provide an indication.

6. A process as claimed in claim 4 in which an initial instruction word value representing an instruction word is a non-zero, the step of operating on the instruction word value with an operation class value comprises adding an operation value equal to binary "one" to each portion of the initial instruction word value for which the operation provides a constraint to produce a result, and the step of determining a violation of any constraint comprises ANDing a mask value having a binary "one" at each high valued bit of each portion with the result to provide an indication.

7. A process as claimed in claim 4 in which an initial instruction word value representing an instruction word is a non-zero, the step of operating on the instruction word value with an operation class value comprises adding an operation value equal to binary "one" to each portion of the initial instruction word value for which the operation provides a constraint to produce a result, and the step of determining a violation of any constraint comprises:

exclusively ORing the result with first the instruction word value, and then the operation value, and ANDing with the mask equal to a binary "one" in each portion to provide an indication.

8. A process for packing an instruction word comprising the steps of:

providing an instruction word value representing an instruction word into which an operation is to be fit, wherein the instruction word value is a binary word, the binary word having a plurality of portions representing constraints on packing the operation word into the instruction word;

combining the instruction word value with an operation class value of an operation to be fit into the instruction word to produce a result, the operation class value having a plurality of portions representing constraints of the operation affecting the instruction word; and determining a violation of any constraint to determine that the operation does not fit the format by generating an overflow of a portion of the instruction word value.

9. A process as claimed in claim 8 in which the step of determining a violation of any constraint to determine that the operation does not fit the format by generating an overflow of a portion of the instruction word value comprises combining a mask with the result.

10. A process as claimed in claim 8 in which the step of providing an instruction word value comprises providing a value for each portion, and the step of combining provides values of portions of an instruction word value which will overflow when combined with the mask when the constraint represented by the portion is exceeded.

11. A method for packing an instruction word with operations, the method comprising:

formulating a first binary word that comprises a number of portions, each of the portions corresponding to a respective constraint on packing an operation into the instruction word, acting on the first binary word with a second binary word that represents a first operation that is trying to be packed into the instruction word, the second binary word defining which constraints are affected by the first operation, determining whether action of the second binary word on the first binary word causes violation of any of the constraints, and packing the first operation into the instruction word if no constraints are violated.

12. The method of claim 11 wherein the action of the second binary word on the first binary word results in a third binary word, the method further comprising:

acting on the third binary word with a fourth binary word that represents a second operation that is trying to be packed into the instruction word, the fourth binary word defining which of the constraints are affected by the second operation, determining whether action of the fourth binary word on the third binary word causes violation of any of the constraints, and packing the second operation into the instruction word if no constraints are violated.

13. The method of claim 11 wherein the first binary word contains only zeroes, wherein the acting step comprises adding the second binary word to the first binary word to form a third binary word, and wherein the determining step comprises ANDing a mask value to the third binary word, wherein the ANDing produces all zeroes if no constraints are violated.

14. The method of claim 11 wherein the instruction word is processed by a processor comprising a number of different functional units, each of the functional units performing in parallel, wherein the first operation is classified in a class according to which of the functional units can execute the operation.

15. The method of claim 14 wherein the constraints affected by the first operation are defined according to the class of the first operation.

16. The method of claim 14 wherein the constraints enforce limits on the maximum number of different classes of operations that can be packed into the instruction word.

17. The method of claim 11 wherein the determining step comprises determining whether there is an overflow of any of the portions of the first binary word when the first binary word is acted on by the second binary word.

* * * * *